May 6, 1947.  C. W. HANSELL  2,419,994
DIRECTION FINDING
Filed Aug. 1, 1942
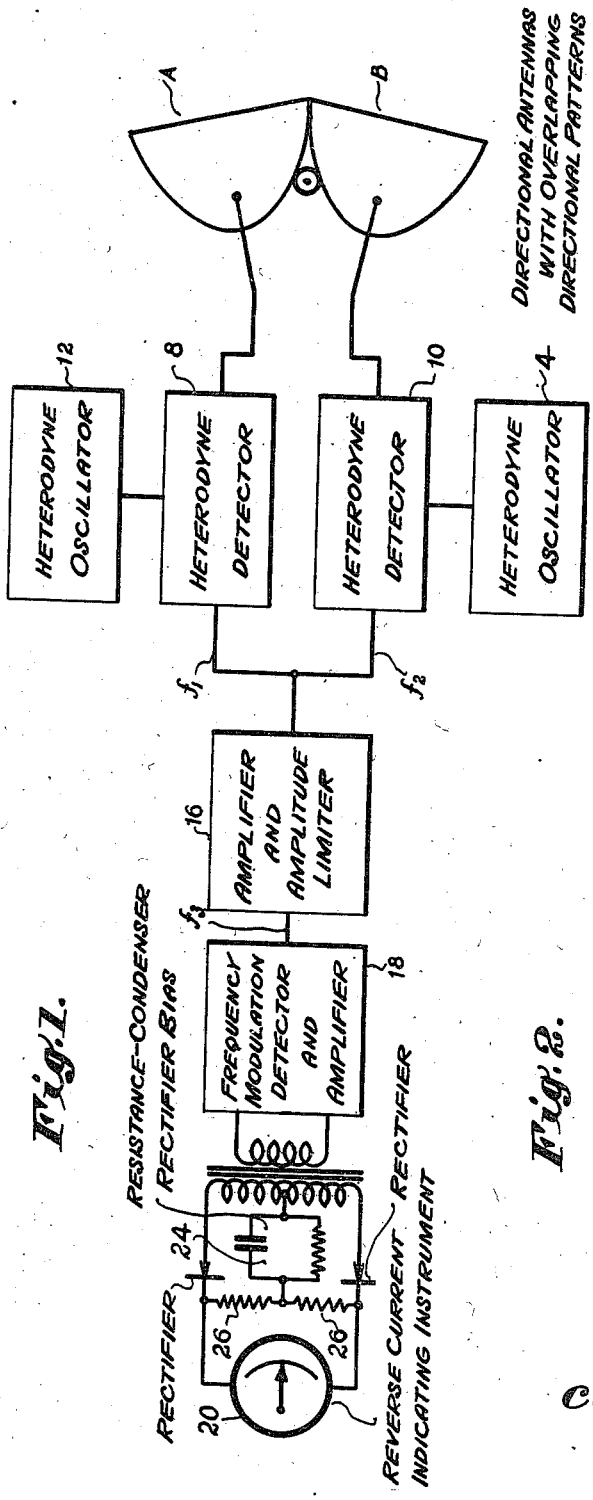
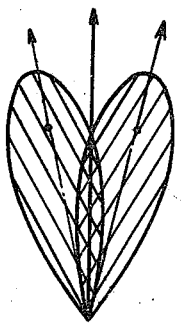
INVENTOR
Clarence W. Hansell
BY H. S. Grover
ATTORNEY Patented May 6, 1947

2,419,994

UNITED STATES PATENT OFFICE 2,419,994

DIRECTION FINDING

Clarence W. Hansell, Port Jefferson, N. Y., assignor to Radio Corporation of America, a corporation of Delaware Application August 1, 1942, Serial No. 453,252

3 Claims. (Cl. 250—11)

This application concerns a new and improved method of and means for locating remote wave energy sources or points at which wave energy is reflected from remote or local wave energy sources. The wave energy sources may be of ultra-high-frequency, radio-frequency, sound waves or infrared rays. To simplify the disclosure they have been referred to herein as wave energy or radiant energy.

In this new method and means I make use of a phenomenon disclosed in detail in my U. S. application #389,161, filed April 18, 1941, Patent No. 2,388,052 issued October 30, 1945. As disclosed in said application, when two currents of different frequency $f1$ and $f2$ but of substantially equal amplitudes $V1$ and $V2$ are passed through an amplitude limiter, the resulting current coming from the limiter is a current at a frequency $f3$ approximately half way between the frequencies of the two input currents, but this constant frequency output current suffers a substantially instantaneous phase reversal each time the two input current components are passing through the condition of opposing phase. This is equivalent to saying that the output current from the limiter is at a frequency about half way between the two input frequencies except for very great momentary frequency shifts which take place at the instant of opposing phase of the two input currents, that is, once per cycle of the difference frequency as shown in Figure 3 of my above identified application.

If the two input currents are slightly different in amplitude, the momentary large frequency shift will be in a direction from the said intermediate value of frequency toward and through the frequency of the stronger input current. If the relative magnitude of the two input currents is reversed, the direction of the momentary frequency shift is reversed. Consequently, an extremely small change in relative amplitudes of the two input currents around the condition of equality will reverse the direction of the large peak frequency shifts.

An amplitude limiter as defined for the purposes of this patent application is any device which removes substantially all variation in strength or amplitude of alternating currents passed through it but leaves substantially all variations in phase or frequency of the currents undisturbed, within a required frequency band. A number of devices capable of use as amplitude limiters are already well known in the art and it appears likely that many other devices have been or will be devised to accomplish limiting.

If two currents of different frequencies, the respective relative strengths of which are proportional to the positioning or orientation of two directive pick-up devices with respect to a radiant energy source (direct or reflected), are applied to an amplitude limiter, a resultant current is obtained of a frequency intermediate the frequencies of the two currents except for sharp peaks which extend away from the weaker current toward and through the stronger current so that the average frequency of the resultant is equal to the frequency of the stronger current. These sharp peaks occur when the currents oppose in phase. Accordingly, there is provided a resultant current with large frequency deviations which are in the direction from the mean or intermediate frequency toward and through the stronger current. This resultant is then passed through a frequency modulation detector and the peaks detected to provide an indication of which current is the stronger to thereby provide an indication of the positions of the two pick-up devices relative to the wave source and finally an indication of the wave source position. Thus, extremely small differences in the strength of the two currents can be detected, and an extremely accurate indication of the direction of the source can be provided.

In describing my invention in detail reference will be made to the attached drawings where, in Figure 1, I have shown an embodiment of a radiant energy source direction locating system arranged in accordance with my invention and utilizing the phenomenon which takes place in an amplitude limiter when two currents of nearly equal strength are applied to it. In the figure is shown a direction finder system applicable to radio navigation, collision prevention and object finding. Obviously, the invention may be put to many other uses.

In Figure 2 I have shown the directivity pattern of the pick-up devices used in the system of Figure 1.

In Figure 1, A and B are directional pick-up devices of appropriate type and, as shown, are mounted for movement or orientation so that their response characteristics can be altered. 12 and 4 are sources of oscillations coupled respectively to mixers 8 and 10. The heterodyne detectors 8 and 10 supply the two currents $f1$ and $f2$ to an amplifier and limiter 16, wherein the phenomenon described before takes place so that a resultant current $f3$ is fed to the frequency modulation detector and amplifier 18 and thence to a rectifying and indicating system designated generally at 20.

The system comprises two directional antennas, A and B, having reception maxima in different directions such that the directional patterns of the two antennas overlap as shown in Figure 2. If both antennas pick up radiant energy such as radio waves from a common distant source, the amount of current delivered by the antennas to the amplifier and mixers in 8 and 10 is equal only when the antennas are pointed in directions at substantially equal angles on opposite sides of the direction to the distant source. If then we have a sensitive indication of equality of the two currents, the antennas may be utilized for very sensitive indications of direction from the antennas to the source.

In making a directional observation the antenna may be rotated physically until they pick up equal currents or, over a range of directions, the currents may be unequally attenuated or amplified to make the resultant currents equal, in which case, the difference in attenuation or amplification of the currents will provide an indication of direction. In Figure 1, is is assumed that the antennas are physically rotated and the direction to a source of radio waves will be indicated by the position at which the antennas deliver equal currents.

In the system of Figure 1, currents from the two antennas are delivered to two similar heterodyne detectors 8 and 10, outputs from which are combined in a single output circuit and delivered through an amplitude limiter 16 to a frequency modulation detector 18.

The two heterodyne detectors are supplied with locally produced heterodyning currents from 12 and 14 which are somewhat different in frequency so that the two detector output currents have different frequencies, $f1$ and $f2$, and beat together in the amplitude limiter.

The current, $f3$, in the output from the limiter will be a new current with an average, or carrier, frequency equal to the frequency of the stronger of the currents entering the limiter and this current will be phase modulated by the weaker current. When the two limiter input currents are nearly equal in magnitude, the wave form of phase modulation and the corresponding wave form of frequency modulation will be greatly distorted with relatively high peaks in one direction. Furthermore, as previously explained, the direction of frequency swing at the peak, or the polarity of the modulation peak, will reverse abruptly as one current changes from a lesser to a greater strength than the strength of the other current.

Output from the amplitude limiter, with its distorted wave form of frequency modulation produced by the interaction of the two currents in the limiter is applied to a frequency modulation detector, 18, the output of which reproduces the distorted wave form of frequency modulation.

The distorted wave form of current may be observed on a cathode ray oscilloscope as previously explained in connection with Figure 5 of the above mentioned application, or it may be utilized to produce a direct current which reverses in direction as the polarity of the modulation peak reverses, by means of the arrangement shown in Figure 1.

The indicator of Figure 1 consists of two rectifiers of any similar type delivering rectified direct current pulses to a common resistance-condenser rectifier bias or load circuit 24. Because of the unsymmetrically peaked wave form of potential delivered to the rectifiers one rectifier is supplied with much greater peak forward potential than the other and therefore supplies all or most of the rectified current. If the polarity of the peaks is reversed, the current is transferred from one rectifier to the other. This transfer of current from one rectifier to the other is utilized through coupling resistances 26 to supply input to a reverse current indicating instrument.

In taking a bearing the antennas are rotated until the reverse current instrument shows a deflection in one direction or the other to show that the distant source of radio waves is within the beam of one of the antennas. It is further rotated until the polarity of the current suddenly reverses. Then the direction of the distant radio waves is indicated, with an extreme precision of indication, by the direction in which the indicator deflection reverses.

By this means extremely precise indications of direction are obtainable with each of the antennas set not very far from its maximum of reception so that noise has a small effect upon the precision of the directional indication. This is in marked contrast to the usual method of direction finding in which a minimum of antenna pick-up from the distant radio wave source is used to indicate direction and in which noise has a maximum possibility to disturb the precision of directional indication.

I claim:

1. In apparatus of the class described at least two directional pick-up devices in the field of a source of radiant energy, connections to one of said pick-up devices for producing wave energy of a first frequency, connections to the other of said pick-up devices for producing wave energy of a second frequency, the amplitudes of said wave energies depending on the positioning of said pick-up devices with respect to said source, an amplitude limiter, connections for impressing both of said wave energies on said amplitude limiter, a wave length modulation detector coupled to said amplitude limiter, and an indicator coupled to said detector.

2. The method of determining the direction of arrival of a radio wave, including the steps of deriving from said wave two voltages of different frequencies which are differently related in amplitude to the angle of arrival of said wave with respect to an angularly adjustable reference line, combining said voltages to produce a resultant voltage having variations in amplitude and variations in instantaneous frequency which are a function of the difference in amplitude between said two voltages, limiting said resultant voltage to remove therefrom said variations in amplitude, detecting said variations in instantaneous frequency to produce an alternating current wave having positive and negative peaks, and adjusting the angle of said reference line to cause opposite peaks of said alternating current wave to be equal in magnitude.

3. A direction finder including directional pick-up means, means for deriving therefrom in response to the arrival of energy two voltages of different frequencies having amplitudes depending upon the angular position of said pickup means with respect to the line of arrival of said energy, means for combining said voltages to produce a resultant voltage varying in instantaneous frequency in response to the difference in amplitude between said two voltages, and means for detecting said variations in frequency.

CLARENCE W. HANSELL.

REFERENCES CITED

The following references are of record in the file of this patent:

UNITED STATES PATENTS

| Number | Name | Date |
|---|---|---|
| 2,213,273 | Earp | Sept. 3, 1940 |
| 2,274,546 | Hugenholtz | Feb. 24, 1942 |

FOREIGN PATENTS

| Number | Country | Date |
|---|---|---|
| 525,180 | British | Aug. 22, 1940 |